US006242881B1

(12) United States Patent
Giordano

(10) Patent No.: US 6,242,881 B1
(45) Date of Patent: Jun. 5, 2001

(54) ALTERNATING CURRENT-STARTING DEVICE FOR A HELICOPTER TURBINE ENGINE UNIT

(75) Inventor: Serge Giordano, Marseilles (FR)

(73) Assignee: Eurocopter (FR)

(*) Notice: Subject to any disclaimer, the term of this patent is extended or adjusted under 35 U.S.C. 154(b) by 0 days.

(21) Appl. No.: 09/162,950

(22) Filed: Sep. 29, 1998

(30) Foreign Application Priority Data

Sep. 30, 1997 (FR) .................................................. 97 12125

(51) Int. Cl.[7] .................................................. H02P 1/46

(52) U.S. Cl. .................... 318/700; 244/53 A; 244/17.11; 290/22; 290/38 R

(58) Field of Search .................................... 318/700, 701, 318/254, 140–159; 290/22–29, 31, 38 R–40 R; 244/17.11, 17.13, 17.17, 17.19, 53 A

(56) References Cited

U.S. PATENT DOCUMENTS 4,456,830 * 6/1984 Cronin .................................. 290/27
4,473,752 9/1984 Cronin ................................ 310/156
5,495,127 * 2/1996 Aota et al. ............................ 290/31
5,899,411 * 5/1999 Latos et al. ........................... 290/44

FOREIGN PATENT DOCUMENTS 2 330 872 6/1977 (FR) .
2 043 359 10/1980 (GB) .

* cited by examiner

*Primary Examiner*—David S. Martin
(74) *Attorney, Agent, or Firm*—Piper Marbury Rodnick & Wolfe

(57) ABSTRACT

The starting device for a turbine engine unit of a helicopter includes an electric motor starter, supplied from an electrical power source, which can be outside the helicopter and temporarily connected to the starting device through a connection socket, or onboard on the helicopter. The starter is supplied with alternating current and includes an alternating current electric motor, preferably an auto-controlled synchronous motor, and the onboard electrical power source is preferably an alternator driven, during independent starting, from an auxiliary power unit with a turbo-machine and itself started by direct current batteries.

6 Claims, 4 Drawing Sheets

ALTERNATING CURRENT-STARTING DEVICE FOR A HELICOPTER TURBINE ENGINE UNIT

FIELD OF THE INVENTION

The invention concerns starting devices for helicopter turbine engine units, of the type which includes an electric motor starter, powered by at least one electrical power source, which can be outside the helicopter and temporarily connected to the starting device by a connection socket, or onboard the helicopter.

BACKGROUND OF THE INVENTION

It is known that aircrafts are equipped with sockets called "ground connection", enabling the connection to external direct current or alternating current power units, called external direct current or alternating current units, for the powering of aircrafts with direct or alternating current, according to the different characteristics of voltage and frequency used for the equipment onboard the aircrafts, when the latter are at a standstill at airfields, the external power units being able to be at fixed points or, most often, movable because they are installed on service vehicles.

In comparison to aircraft, the principal advantage of helicopters is to be able to move from one point to another without the external infrastructure obligatory requirement for a runway, an electrical supply terminal or external starting unit.

This independence requires that a helicopter be equipped with onboard means enabling it to start independently its power unit, and in particular its turbine engine assembly with one or more turbine(s).

The specific uses of helicopters, leading them to take off outside airfields, thus makes it necessary to permanently provide, onboard each helicopter, a starting device comprising at least one energy source enabling the independent starting of the helicopter turbine engine unit.

Currently, energy sources enabling an independent start up of the turbine(s) of a helicopter are based on one of two types÷

- compressed gas tanks, generally of air, connected to both a dedicated installation and to at least one pneumatic starter,
- at least one battery of electrochemical accumulators, connected to both a dedicated installation and to at least one direct current electrical starter, this battery also being able to contribute to the electrical powering of other equipment on the helicopter.

In the second aforementioned case, the starting device can include at least one generator-starter, which is a reversible electrical starter which, once start up has been executed, powers the electrical network on board the helicopter, or at least one standard electrical starter (non reversible).

The diagram of the principle of a state of the art starting circuit for helicopter turbines is shown in FIG. 1. The curves characteristic both of the direct current starter motor torque of the circuit of FIG. 1 and of the resisting torque due to the turbine driven by this starter according to the rotational speed are shown in the graph in FIG. 2.

Onboard the helicopter, the outline of which is indicated by 1 in FIG. 1, the starting device includes a three-phase alternator 2, usually mechanically driven by the helicopter main transmission gear box, itself driven by the turbine engine assembly of this helicopter after its starting up, this alternator 2 being able to be connected, by the closing of a line contact 3, to a set 4 of three busbars for the distribution of three phase alternating current, to which can be connected, in parallel, an external alternating current power unit 5, by the closing of the contactor 6 of the alternating current ground connection socket. The contactor 3 is closed in the alternator mode when all the necessary conditions are met and the contactor 6 is closed in the "power unit" mode when all the necessary conditions are also met to supply the distribution terminals 4 with three phase alternating current, which terminals 4 themselves supply in parallel for example an air conditioning equipment and weapon's systems (not shown) of the helicopter, as well as a rectifier transformer 7 which transforms the three phase alternating current into direct current (28V) for the corresponding applications. In particular, the rectifier transformer 7 has its positive terminal connected by the rectifier transformer contactor 8 to a busbar 9 for distribution of the direct current, whereas its "−" terminal is permanently connected to a reference earth 10. In parallel, the direct current busbar 9 is connected, by the contactor 11, to the ground connection socket 12 to an external direct current power unit, the "−" terminal of this socket 12 being also permanently connected to the reference earth 10. Also in parallel, the direct current busbar 9 can be connected by the closing of the battery contactor 13 to the "+" terminal of an onboard battery 14, which is charged through the busbar 9 during normal operation after starting the turbine engine assembly, and which enables the independent starting of this assembly (not shown). The direct current busbar 9 itself powers the electric motor starter 15 by the closure of a starting contactor 16, which is a power contactor.

Since the direct current turbine starter 15 is a starter by nature not easily torque adjustable, two resistances 17 and 18 are mounted in series between the starter 15 and the reference earth 10 in order to avoid "the unloaded racing" of the starter 15, a second starting contactor 19 being connected in parallel to the resistance 17. Although the direct current starter 15 is always mechanically loaded by the resisting torque due to the driven turbine(s), its peak current when starting is such that it is necessary to limit it with the resistances 17 and 18, and therefore to limit the motor torque delivered by the direct current starter 15. According to whether it is closed or open, the contactor 19 activates either the single resistance 18 or that of the two series resistances 17 and 18, respectively.

By referring to the dashed line curve 20 of FIG. 2, expressing the motor torque of the direct current starter 15 as according to its rotational speed, it appears that if the current was not limited by the resistances 17 and 18, the starting torque (at zero speed) would be at level A and applied almost instantaneously, from which risks of breaking the transmission shaft. (not shown) connecting the starter 15 to the turbine. The contactor 19 being open, the function of the series resistances 17 and 18 is to restore the motor starting torque to the level B, the resisting torque then being zero. From the point B, the operating characteristic advances along BD. At the point D, the motor torque Cm becomes too weak relative to the resisting torque Cr associated with point D' on the continuous line curve 21. In order to avoid too significant a slow down, the resistance 17 is then short circuited by closing the contactor 19, 4 so that the motor torque characteristic Cm again rises to point C, towards the initial characteristic AZ, and the starting continues along the section CZ of the curve 20. The intensity of the direct current is from 1000 to 1200 A at levels B and C, under a base voltage of about 28 V which then decreases, and at D the intensity is of the order of 800 A.

Such starting is therefore very abrupt, and not very torque controllable, and the starting circuit requires conductors of significant sections, therefore heavy, considering the high intensity (of the order of 1200 A) of the direct current carried.

In short, a starting device with a series type of direct current starter motor, requires inserted electrical resistances and power contactors enabling the commutating of these resistances, as well as large diameter conductor cables (67 $mm^2$ copper for example) for the power circuit, these cables not being able to be replaced by cables of more reduced diameter in a metal or alloy of less density than copper, such as aluminium, when the conductor cables are installed on the helicopter in locations, such as the transmission support platform, where the operating temperatures are high.

Such a starting device has the disadvantage that the motor torque supplied by the direct current starter is violent at starting and not very controllable and adaptable to the resisting torque, since the only regulation of the motor torque is obtained by the single regulation of the possible current by the commutation of the resistance 17. This results in two major constraints, which are a current of high intensity in the electrical network, from which the use, as mentioned above, of large diameter conductors, therefore heavier, and a mechanical stress on the whole of the mechanical linkage system, between the starter output shaft and the turbine, and more exactly its accessory box by which means the starting is carried out.

SUMMARY OF THE INVENTION

The problem at the basis of the invention is to remedy the aforementioned disadvantages and to propose a starting device better satisfying the various engineering requirements of the art than those with a direct current electrical starter motor, and in particular those which entail a significant gross operating weight improvement and a net improvement of starting performances.

An aim of the invention is to propose a starting device enabling the carrying out of a "flexible" start up by limiting the stress on the electrical network and the mechanical stress on the transmission line, between the starter shaft and the turbo engine unit to start.

For this purpose, the starting device of the invention, including at least one electrical motor starter, intended to be powered from at least two electrical power sources, one of which is external to the helicopter and temporarily connected to the starting device by a connection socket, and the other of which is on board the helicopter, is characterised in that the aforesaid starter is supplied with alternating current form one or other of said two sources and includes an alternating current electric motor. A very significant gross operating weight improvement is in this way obtained, this advantage resulting in particular from a reduction of the diameter of the conductor cables to 9 $mm^2$, dimensioned for a maximum alternating current intensity of 80 A, whereas the maximum direct current intensity reaches 1200 A. The weight gains result also from the removal of the starting resistances, of the rectifier transformer and the associated contactors, and simultaneously the manufacture of the starting device is made considerably easier.

To advantage, the alternating current motor is powered with electrical current by at least one power conversion unit, driving the motor with current and itself powered with electrical current from at least one electrical power source. In this way, the starting performances can be increased, by a control of the starting current, giving a progressive and non abrupt starting torque at start up, and by the limitation of the mechanical stress on the transmission between the starter and the turbine as a consequence of the starting torque in this way controlled. To advantage, the alternating current motor is a synchronous motor, which enables improving the starting current control, and therefore the motor torque and/or the starting speed. In fact, the synchronous motor, owing to a resolver embedded in this motor, delivers to the power conversion unit, electrical information about the angular positions of the rotor of the aforesaid motor, in order to monitor and adjust the rotational speed of the motor to a reference value.

To advantage, the power conversion unit can include an output power stage, delivering a current rule to the alternating current motor, as well as to at least one memory in which is stored at least one torque and/or speed driving law.

The synchronous motor is preferably auto driven and co-operates with a resolver and the power conversion unit, using mapping to deliver to the motor a current rule as a function of the recorded torque and/or speed rule stored in memory.

The use of a synchronous motor, preferably auto controlling, requires the starter to be powered by three phase alternating current, preferably at 200 V and 400 Hz. This type of starter is suitable particularly therefore to helicopters equipped with a three phase electrical power source at the time of starting. For this purpose, the starting device can include at least cone connection socket to at least one electrical power source constituted from at least one external power unit supplying alternating current. In parallel, the alternating current starter can be supplied by at least one alternator on board the helicopter.

But in the absence of a three phase power source on the helicopter at the time of starting of its turbine engine assembly, it remains possible to power the starter with alternating current from at least one accumulator battery, onboard the helicopter, and by means of at least one onboard converter of direct current into alternating current.

If the start up device comprises such an onboard converter, it is then also possible to allow for at least one connection socket to at least one electrical power source constituted by at least one external power unit supplying direct current, or external power unit with direct current, although this solution is not preferred.

In accordance with an advantageous implementation, the alternating current starter is powered by at least one onboard alternator, as already mentioned above, and the aforesaid alternator is itself supplied by at least one onboard auxiliary transmission gear box and driven in turn by at least one turbo-machine of at least one onboard auxiliary power unit and being able itself to be started by at least one direct current accumulator battery on the helicopter. In this way, the alternator can be powered when the helicopter is on the ground, for independent starting, without the assistance of an external alternating current power unit.

In practice, the alternating current starter is powered with alternating current by means of at least one starting contactor, itself powered by at least one alternating current distribution busbar and connected in parallel at least to one alternator onboard the helicopter and to at least one onboard socket for the connection to at least one external power unit supplying alternating current.

BRIEF DESCRIPTION OF THE DRAWINGS

Other characteristics and advantages of the invention will follow from the description given below, without limitation, of implementation examples, with reference to the appended drawings in which.

DETAILED DESCRIPTION OF THE INVENTION

Figure 3:
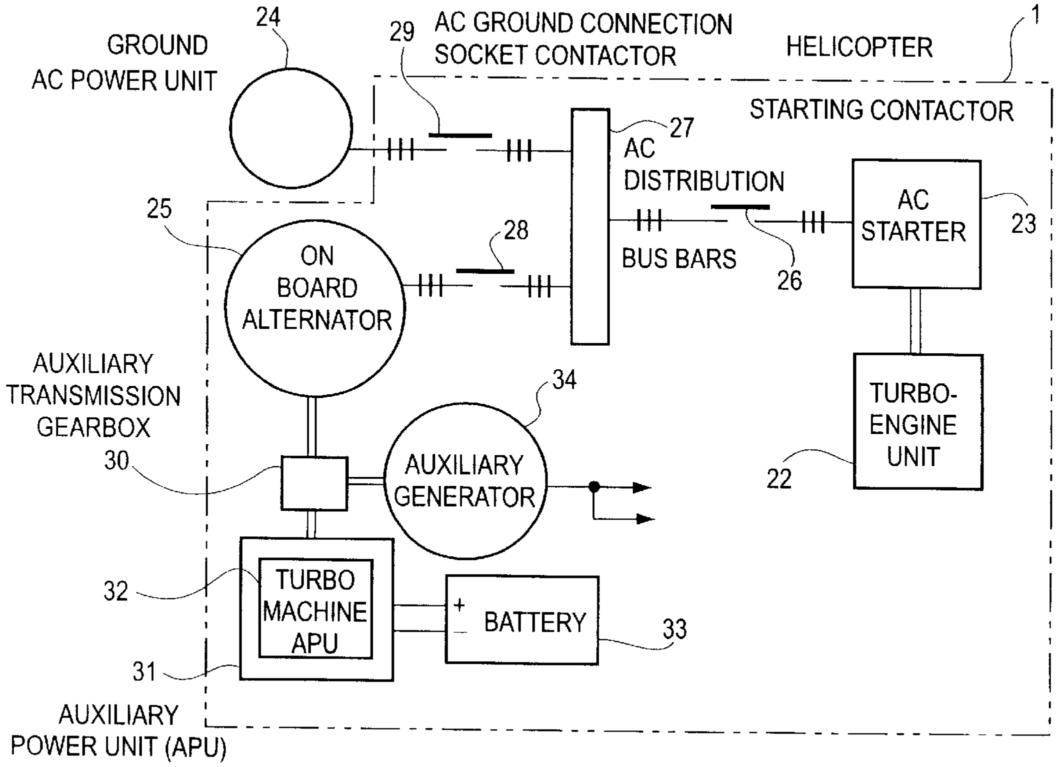
FIG. 3 is a diagram of the starting device for a helicopter turbine engine unit in accordance with the invention.

The starting device of FIG. 3, for starting the turbo engine unit 22 of a helicopter 1, includes an electrical starter 23 with auto-controlled synchronous motor, also called an autosynchronous motor, powered with three phase alternating current at 220V and 400 Hz from a three phase power source, which can be an external alternating current power unit 24 or an onboard alternator 25. The alternating current starter 23 is supplied with three-phase current by the closure of the starting contactor 26 connecting it to a set 27 of three phase current distribution busbars. These busbars 27 are connected in parallel to the alternator 25 and to the ground alternating current power unit 24 respectively by a line contactor 28 and a socket contactor 29 of the alternating current ground connection socket.

Outside airfields, i.e. in the absence of an external ground alternating current power unit, the independent starting of the turbine engine unit 22 is possible in the following way: the alternator 25 is mechanically driven by an onboard auxiliary transmission gear box 30, itself driven by the turbo-machine 32 of an auxiliary power unit 31 onboard the helicopter 1, the auxiliary transmission box driving in parallel an auxiliary generator 34 supplying other onboard networks, whereas the turbo machine 32 of the auxiliary power unit 31 is itself started by a battery of onboard direct current accumulators 33.

More exactly, when the external power unit 24 cannot be used, the order of operations for the independent starting of the turbo engine unit 22 is as follows: from the battery 33, the auxiliary power unit 31 is first started, the turbo machine 32 of which mechanically drives the auxiliary transmission gear box 30. This after drives in turn various equipment and in particular, on the one hand, an auxiliary or backup generator 34, in order to power various equipment with electrical current, and, on the other hand, the alternator 25 which, when a threshold rotation speed is reached, is cut in and delivers a three phase current.

Figure 4:
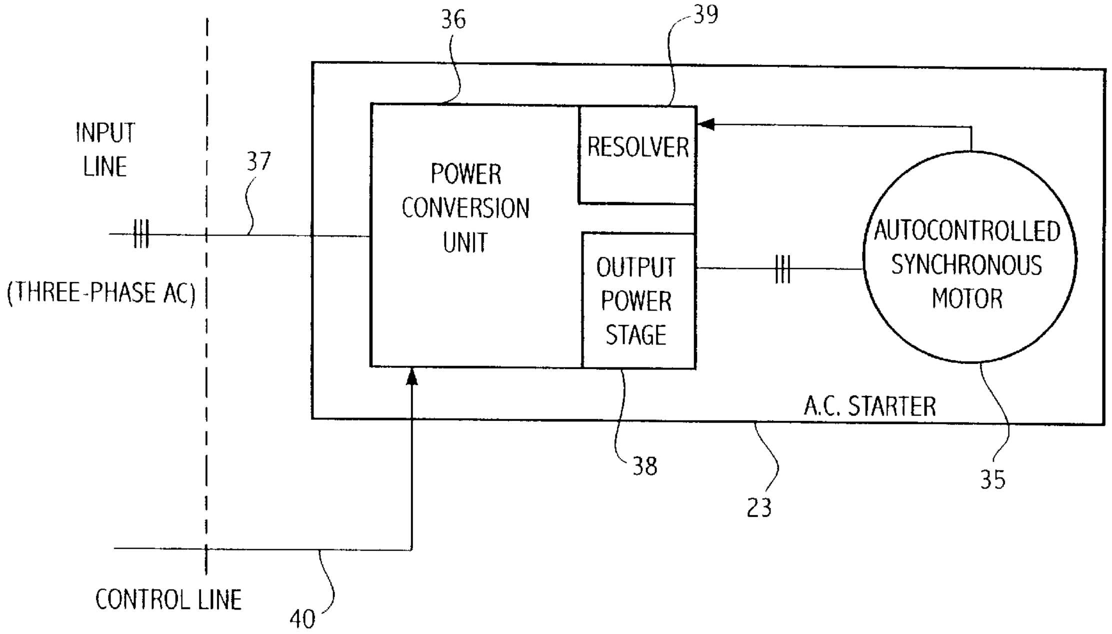
FIG. 4 is a diagram of the alternating current starter of the device of FIG. 3.

FIG. 4 shows that the alternating current starter 23 includes mainly an auto-controlled synchronous motor 35 and a power conversion unit 36, which is powered with three phase electrical current by the input line 37 connected to the contactor 26. The unit 36 includes an output power stage 38, through which it supplies three-phase current to the synchronous motor 35 for which the unit 36 controls current. For this purpose, the synchronous motor 35 comprises an integral resolver 39, shown for convenience against the unit 36, to which the motor 35 transmits electrical information of the angular position of its rotor, so that the rotational speed of the rotor of the motor 35 is monitored and adjusted to a reference value. Control instructions and operating modes can be transmitted to the unit 36 by the control line 40.

Figure 1:
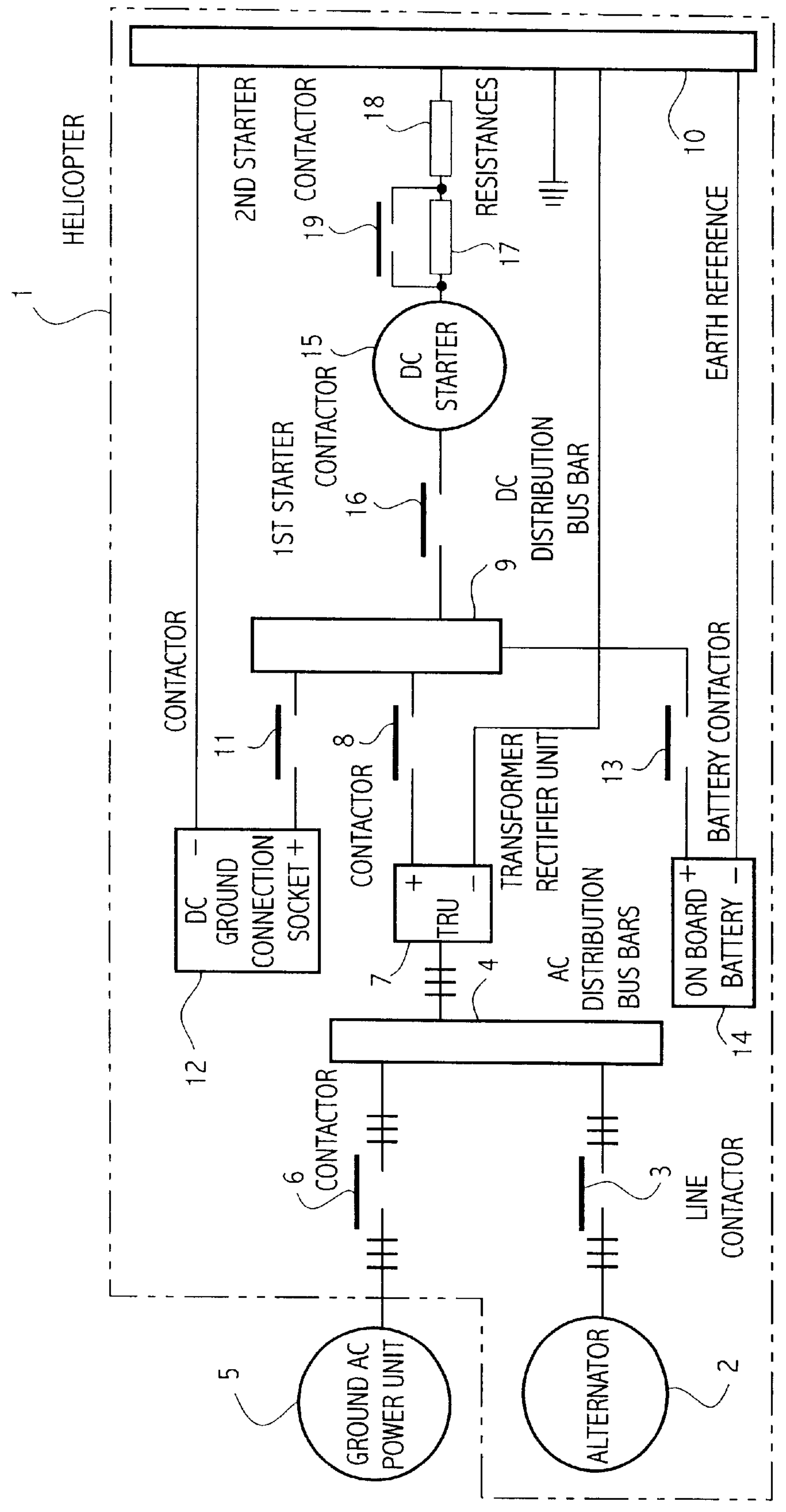
FIG. 1 PRIOR ART
FIG. 1 is a diagram of a state of the art starting circuit already described above.
Figure 2:
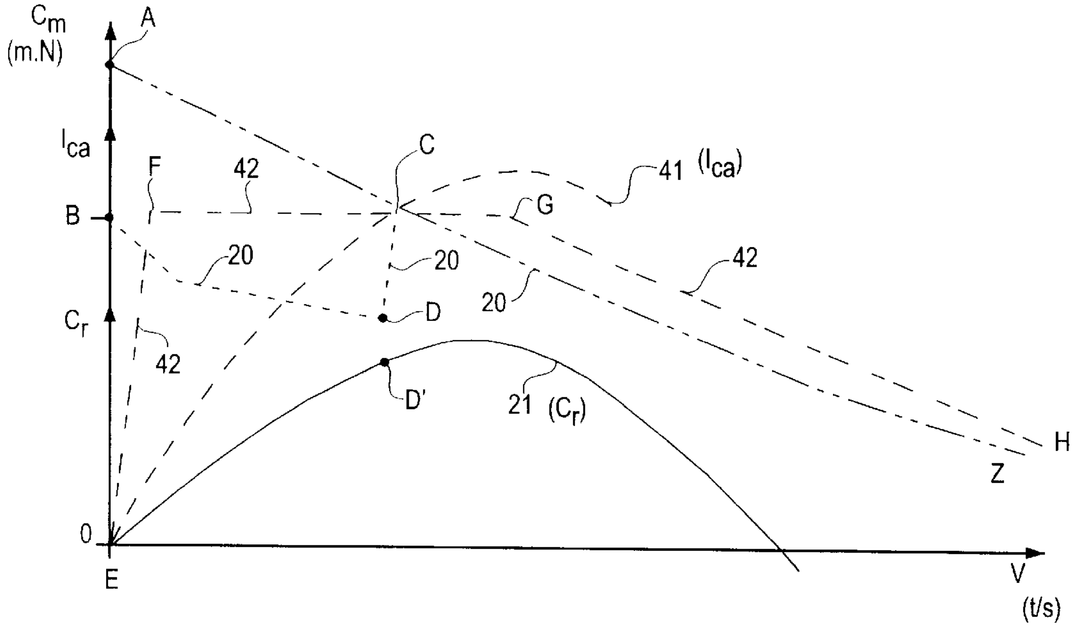
FIG. 2 is a graph showing particularly curves of motor torque and resisting torque according to the speed of the starter of FIG. 1.

The use of an auto-controlled synchronous motor 35 enables carrying out a flexible start up, limiting the stress on the electrical network by the control of the starting current, the current Ica consumed by the alternating current starter 23 being shown by the curve 41 on the graph of FIG. 2. This results in a limitation of current draw in the network. The flexible starting enabled by the auto-controlled synchronous motor 35 also limits the mechanical stress, by the establishment of a more progressive motor torque along the segment E F of the curve 42 with three segments showing, on the graph of FIG. 2, the development of the alternating current motor torque, according to the speed. By comparison, with the curve 20 showing the direct current motor torque, the limitation of the mechanical stress enabled by the synchronous motor 35 can be interpreted as resulting from the shifting forward of the point B towards the point F in FIG. 2, the alternating current motor torque of the curve 42 advancing then along the segment F G, with constant motor torque, then decreasing progressively along the segment G H when the speed V increases. The alternating current starter 23 in this way delivers, during starting, a motor torque Cm having a form E F G H (curve 42) which is of the same style as the form of the consumed intensity (curve 41), reducing in a very significant way the starting time (relative to a direct current starter) to about 30 s. It is noted that the high currents at the points A and B, useless at the initial instant, no longer exist, and that between the points F and G the motor torque Cm, and therefore also the power, are maximum. It is also noted that the curve 41 of the consumed current shows the style of the curve 21 of the resisting torque Cv. Then, between G and H. the speed V continues to increase, but the current Ica and the motor torque Cm decrease, as does the power Consequently, the alternating current starter 23 with auto-controlled synchronous motor 35 enables a very significant gross operating weight improvement, being able to exceed 20% on the whole of the electrical starting device, by the use of conductors of smaller diameter transporting lower intensity currents than in an installation with a direct current starter, as well as a much finer control of the motor torque characteristic Cm, which can be fitted through the power conversion unit 36 connected to the synchronous motor 35.

One is reminded that an auto-controlled synchronous motor such as 35 is a motor the stator of which comprises reference marks enabling, during the passage of the rotor of this motor opposite these marks, to transmit information, by means of the resolver, about the angular position of the rotor, and therefore about its rotational speed. According to the speed, this electrical information corresponds with voltages, dependent upon the measured frequencies and amplitudes, and which are transmitted to the power conversion unit 36, which controls its output power stage 38 with the result to control the three phase alternating current supply to the motor 35, and therefore the motor torque delivered by the latter. This information, derived from the synchronous motor and the resolver together, positions the rotational speed of the motor 35 of the starter 28, and consequently the motor torque relative to reference values, defined for example in the specifications of the engine manufacturer which manufactured the turbine engine unit 22 started in this way. According to these specifications, the motor torque must be between a maximum limit and a minimum limit, which each have the style of the curve F G H in FIG. 2, so that the actual motor torque can be near the specifications and correspond to a simplified law.

Figure 5:
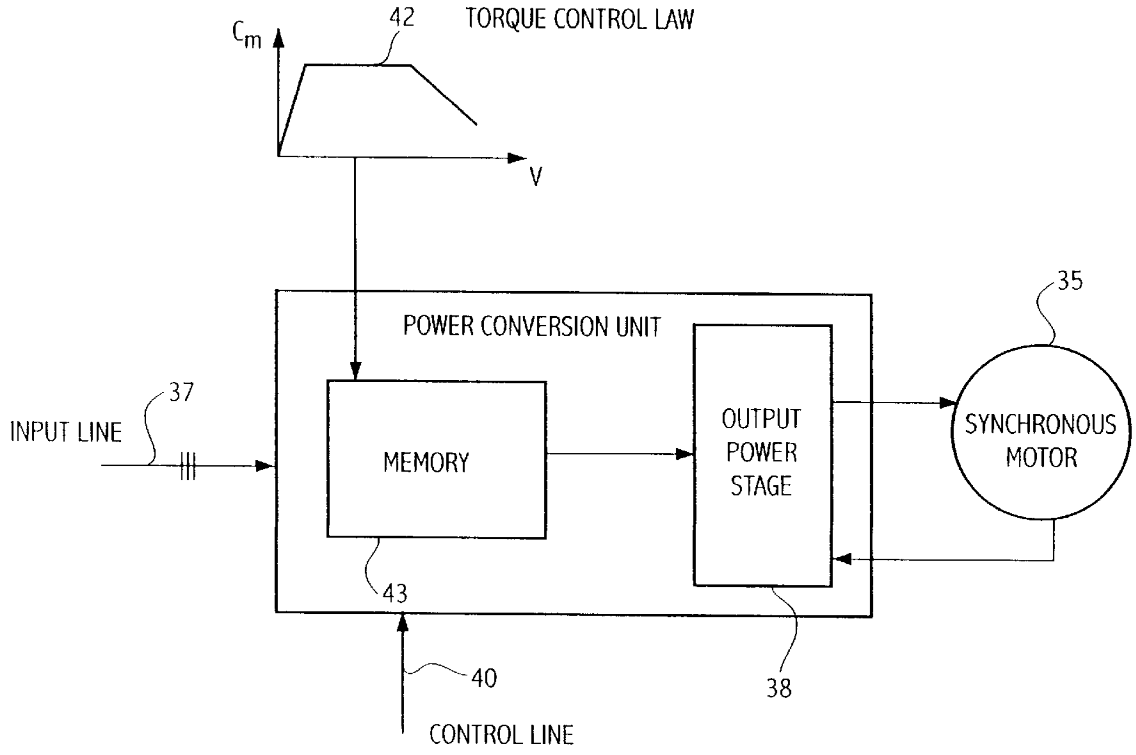
FIG. 5 is another diagram of the auto-controlled synchronous motor starter.

With this purpose, and as shown in FIG. 5, the power conversion unit 36 comprises, in addition to its output power stage 38 and the resolver set which it constitutes with the synchronous motor 35, a memory 43 in which are recorded, in mapping, the torque and/or speed control laws, for example such as the curve E F G H or curve 42 of FIG. 2 and shown diagrammatically in FIG. 5. This mapping enables abiding by a very fine development of the motor torque Cm according to the rotational speed V. In fact, the resolver set made with the synchronous motor 35 itself operates on a reference point, and fixes the motor torque Cm for a given speed V.

Practically speaking, the electronic circuits of the unit 36 are made to give a motor torque rule Cm which is directly proportional to the control alternating current intensity Ica, given the formula Cm=K. Ica, where K is a function of numerous internal parameters, linked to the electronic circuits as well as to the synchronous motor 35. The adjustment of these parameters for determination of the coefficient K enables obtaining desired mapping points (Cm, V), and such an adjustment can be done in the laboratory. The mapping of the motor torque Cm, by avoiding all point by point adjustment, allows a dynamic operation of the device, and it is in this way possible to follow with precision the required motor torque according to the measured speed.

The output stage 38 of the unit 36 delivers in this way to the motor 35 a current rule which corresponds, as a function of the rotational speed, with the motor torque rule stored by mapping in the memory 43 of the unit 36.

Figure 6:
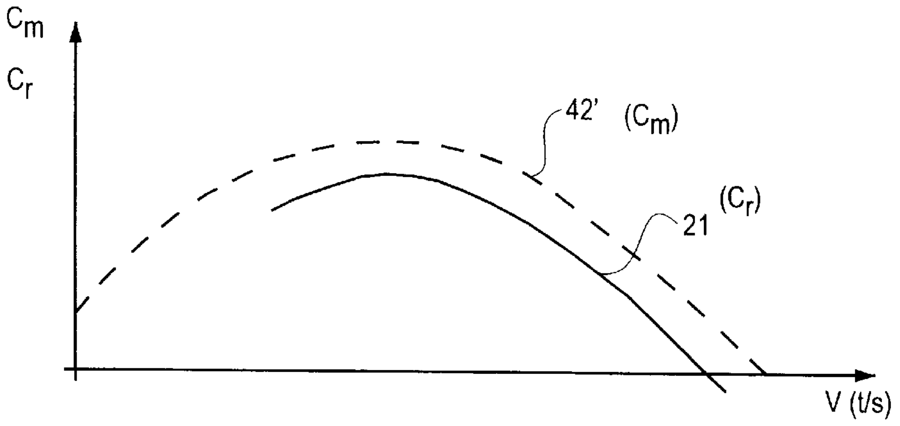
FIG. 6 is a diagram showing a particular motor torque curve, storable in memory in the device of FIG. 5 in order to obtain a particular starting mode according to the resisting torque curve of FIG. 6.

The example in FIG. 5, in which the power conversion unit 36 uses mapping to deliver to the motor 35 a current rule according to a motor torque rule stored in the memory 43, enables the implementation of a more advanced rule to optimise the installation, as shown for example in FIG. 6.

FIG. 6 is a graph indicating, on the ordinate, the motor torque Cm or the resisting torque Cr of the starter according to its rotational speed on the abscissa. In FIG. 6, the curve 21 of the resisting couple Cr which is that of FIG. 2 has been indicated again, and curve 42' represents a motor torque curve Cm corresponding to a map able to be stored in the memory 43 in FIG. 5, and having a profile fitted to that of the curve 21 of the resisting torque so that the difference Cm−Cr is approximately constant. Since it is known that, this difference is directly proportional to the angular acceleration of the motor 35 of the starter, it is understood that a map of the motor torque along the curve 42' in FIG. 6 enables obtaining starting with approximately constant acceleration.

Figure 7:
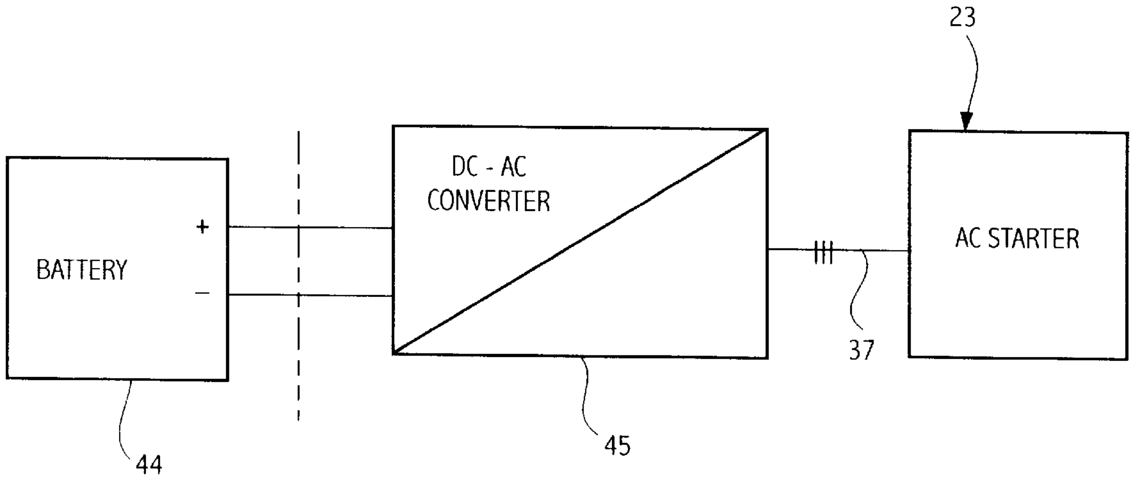
FIG. 7 is a simplified partial diagram of the starting device for the turbine engine unit of a helicopter not equipped with a three-phase start up power source.

For the case where the helicopter is not equipped with a three phase power source at the time of starting, an alternating current starter 23 with auto-controlled synchronous motor as described above can however be used by adopting a starting device such as partially shown in FIG. 7. In this figure, the starting device includes an accumulator battery 44, onboard the helicopter and connected to a converter 45 of direct current into alternating current, also onboard the helicopter and transforming for example the direct current at 28 V received from the battery 44 into three phase alternating current at 200 V and 400 Hz for the powering of the alternating current starter 23, which can have the configurations of FIGS. 4 and 5 described above.

In the case where the starting device comprises a converter such as 45 of direct current into alternating current, the device can also comprise a ground power socket for the connection to an external direct current power unit enabling, on an airfield, the starting of the turbine engine unit with the assistance of the external power unit and without discharging the battery 44, reserved for independent starting.

What is claimed is:

1. A starting device for a turbo engine unit for a helicopter, the helicopter having a connection socket adapted for connection to an alternating current power source external to the helicopter, the starting device comprising:

at least one electrical power source onboard the helicopter, the onboard electrical power source having an alternator, the alternator having an input and an electrical output, at least one onboard auxiliary transmission gear box, the gear box having an output coupled to the input of the alternator and an input, an auxiliary power unit having a turbo-machine, the power unit having an output coupled to the input of the gearbox and an electrical input, and at least one accumulator battery, the battery having an output coupled to the electrical input of the power unit; and at least one starter, the starter intended to be coupled to either of the external power source or the onboard power source, the starter including a resolver, a memory, at least one power conversion unit, an alternating current electric motor having a rotor, the electric motor is a synchronous motor and is coupled to and controlled by the powerconversion unit, the electric motor includes an output coupled to the resolver and provides electrical information of the angular positions of the rotor of the electric motor in order to monitor and adjust the rotational speed of the motor to a recorded value, the synchronous motor is auto-controlled and co-operates with the resolver and the power conversion unit using mapping in order to deliver to the motor a current rule as a function of a recorded torque and/or speed rule stored in the memory, whereby the starter is supplied with AC without any AC to DC conversion and subsequent DC to AC conversion between the starter and either the alternator or the external power source.

2. A starting device in accordance with claim 1, wherein the power conversion unit includes an output power stage, delivering a current rule to the alternating current motor, as well as to at least one memory in which is stored a torque and/or speed control law.

3. A starting device in accordance with claim 1, wherein the mapping memorised in the power conversion unit gives a motor torque rule such that the difference motor torque—resisting torque due to the turbine engine unit is approximately constant, so as to ensure starting with approximately constant acceleration.

4. A starting device in accordance with claim 1, wherein the starter is supplied with three phase alternating current.

5. A starting device in accordance with claim 1, including at least one connection socket to at least one electrical power source constituted by at least one external power unit supplying alternating current.

6. A starting device in accordance with claim 1, wherein the alternating current starter is supplied directly with alternating current by means off at least one starting contactor, itself supplied from at least one alternating current distribution busbar and connected in parallel to at least one alternator onboard the helicopter and to at least one onboard socket for the connection to at least one external power unit supplying alternating current.

* * * * *